United States Patent

Sauder

[15] 3,693,601
[45] Sept. 26, 1972

[54] ROTARY ENGINE

[72] Inventor: Kenneth D. Sauder, 1861 Brentwood Drive, Clearwater, Fla. 33516

[22] Filed: Jan. 6, 1971

[21] Appl. No.: 104,285

[52] U.S. Cl. .................. 123/8.41, 418/9, 418/201
[51] Int. Cl. ............................................. F02b 53/00
[58] Field of Search ......... 418/9, 201, 202; 123/8.41, 123/8.29, 8.23; 60/39.61, 39.23, 39.45, 39.63

[56] References Cited

UNITED STATES PATENTS

| | | |
|---|---|---|
| 2,485,687 | 10/1949 | Bailey ....................... 123/8.41 |
| 2,414,779 | 1/1947 | Tumey et al. .................... 418/9 |
| 3,203,180 | 8/1965 | Price ..................... 60/39.23 X |
| 3,584,459 | 6/1971 | Amann .................. 60/39.23 X |
| 2,808,813 | 10/1957 | Lindhagen et al. ... 60/39.61 X |
| 599,648 | 2/1898 | Stoner ........................... 418/9 |
| 1,734,779 | 11/1929 | Randolph ..................... 418/9 |
| 2,709,336 | 5/1955 | Nilsson et al. ............. 60/39.61 |
| 2,804,260 | 8/1957 | Nilsson et al. .............. 418/9 X |

*Primary Examiner*—Manuel A. Antonakas
*Attorney*—Stefan M. Stein

[57] ABSTRACT

A rotary internal combustion engine including a plurality of rotary pumps arranged in successive communicating fashion such that compression, combustion and expansion of the gases to rotate the engine may take place in a successive, step-like manner. The plurality of rotary pumps may be positioned in substantially linear relation to one another and mounted on one or more common drive shafts serving to rotate the engine. Alternatively, the plurality of rotary pumps may be arranged in a stacked array wherein each pump cooperates with individual drive shaft. An emission control means, also comprising a plurality of cooperatively arranged rotary pumps is arranged in communicating relation with the exhaust end of the engine.

15 Claims, 4 Drawing Figures

PATENTED SEP 26 1972 3,693,601
INVENTOR.
KENNETH D. SAUDER
BY Law Offices of
Stefan M. Stein
ATTORNEY.
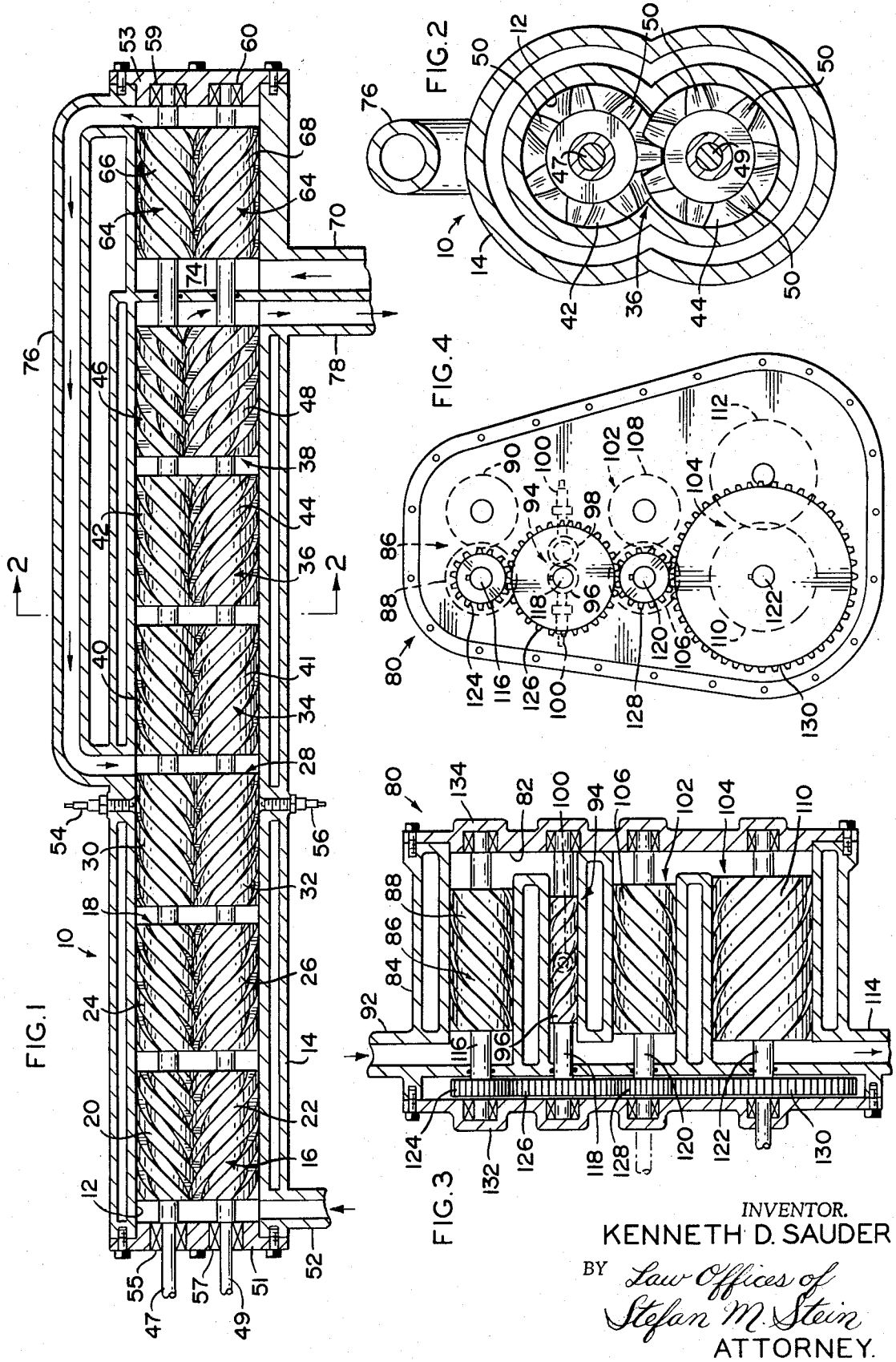

ROTARY ENGINE

BACKGROUND OF THE INVENTION

1. Field of the Invention

This invention relates to a rotary internal combustion engine wherein combustionable gases are compressed, ignited and expanded to rotate the engine in successive steps by means of successively positioned rotary pumps arranged in a cylinder in either a linear or stacked arrangement relative to one another.

2. Description of the Prior Art

Numerous attempts have been made in the past to produce a rotary internal combustion engine capable of taking advantage of the known and theoretical benefits of such an engine over the conventional reciprocating piston type internal combustion engine or the gas turbine engine. Among other advantages, the rotary engine is capable of more complete scavenging of combusted gases, while not having the vibration and balancing problems occuring at high speeds with conventional reciprocating engines. Additional advantages making the rotary engine attractive over more conventional engines, would be the efficiency of the engine over a wide range of speeds. This allows the engine to perform at any desired speed without the necessity of introducing expensive and heavy, power consuming gears used in reciprocating engines or electric gears usually necessary with turbines. Rotary engines are also desirable because of a relatively simple construction which utilizes fewer parts and allows for the elimination of valve gear problems. Rotary engines are also capable of accomplishing relatively high power output from a comparatively small and lighter engine.

Because of these many advantages, many rotary internal combustion engines have been designed. One of the most successful designs to date is the Wankel engine. A modern version of this engine has the stator in the shape of a two-lobed epitrochoid and the rotor in the shape of a trochoid. The symmetrical rotor revolves on a large bearing on the crank arm of the crank shaft which is concentric to the drive shaft. The three tips of the rotor have tip seals. An internal gear on the rotor, concentric with the rotor bearing constrains the rotor to a planetary motion about a sun gear, concentric with the crank shaft. The rotor, with its planetary motion about the sun gear, drives the output shaft three times faster than the crank shaft. The Wankel engine produces distinct intake, compression, combustion-expansion and exhaust phases during rotation of the rotor as in a typical four stroke cycle of a reciprocating engine.

In designing rotary engines, it is common to include a plurality of vanes, movably mounted on the rotor or other type sealing means, which are arranged to engage the internal wall of the cylinder in sealing relation thereto and thereby define distinct chambers. In prior art rotary engines, including rotary pumps and rotary compressors, it has been extremely difficult to construct an efficient high speed engine because the sliding vanes or other sealing means are subjected to the action of centripetal force. This force progressively increases the pressure of the sealing means on the peripheral walls of the cylinder in which the vanes move, thereby prohibitively lowering the efficiency of such machines. This increased friction also results in abnormally rapid wear of the engaging surfaces thereby adding to the inefficiency of the machine through the creation of rough surface. These rough surfaces are the cause of considerable leakage within the cylinder, which of course renders the engine unusable for normal operation.

SUMMARY OF THE INVENTION

The present invention relates to a rotary internal combustion engine designed to include the advantages of simple construction, including fewer moving parts, no valve-gear problems and higher power output, while eliminating many of the disadvantages prevalent in rotary engines up until this time. More specifically, the present invention includes a plurality of rotary pump means each of which may have different capacities and which are successively arranged within cylinder in such manner that distinct intake, compression combustion-expansion, power and exhaust phases will each occur in a successive, stages in a step-like manner. This is accomplished by designing each rotary pump means to include one or more rotor sets successively arranged such that each rotor set is positioned in direct communication with adjacently positioned rotor sets.

In one embodiment of this invention, each of the pump means are successively arranged in substantially linear relation in an elongated cylinder. Each pump means may include a plurality of rotor sets wherein each set includes at least two fluted rotors. Each rotor in a rotor set is mounted on a common drive shaft with correspondingly positioned rotors of the remaining rotor sets. All of the rotors in a rotor set are positioned such that their flutes cooperatively engage and intermesh with the flutes of the other rotors in the set. Consequently, the interaction between the combustible gases passing through the pump means and the fluted rotors causes the distinct intake, compression, combustion-expansion and exhaust phases of a cycle to occur during rotation of the rotors.

In this embodiment the first rotary pump means comprises two sets of fluted rotors arranged at one end of the cylinder adjacent to the cylinder intake. A combustionable mixture of gases entering at this point are compressed in stages by passing through the first and second rotor sets respectively. Upon exiting the second rotor set, the compressed gases pass into the third rotary pump means which is in the form of a single set of fluted rotors. This set of rotors is positioned in the cylinder adjacent to ignition means which may be in the form of conventional sparkplugs. As the sparkplugs are activated the compressed gases ignites and expands. Alternatively the engine of the present invention could function as a diesel engine thereby eliminating the use of spark plugs or the like. The expanded gas then flows into the third rotary pump means which comprises three rotor sets each having at least two fluted rotors. The expanded gas is forced to successively enter the space between both sets of rotors where it is trapped as the flutes turn. The interaction between the gas and the flutes causes a wedging action between the flutes thereby driving the respective drive shafts of each rotor set causing rotation of the engine. The compression ratio of each individual set of rotors is primarily dependent upon the capacity of gases flowing through the rotors, which is itself dependent upon the depth and width of the flutes of the cooperating rotors.

In a second embodiment of this invention the rotor sets comprising the individual rotor pump means are arranged in a substantially stacked array such that the longitudinal axis of each rotor in different sets is substantially parallel to one another. Consequently, the cylinder in which each of the rotors are mounted is compartmented with the various compartments of the cylinder in communication with the next adjacent set of rotors. Each set of rotors in this embodiment cooperates with separate drive shafts which are themselves connected to one another by means of a plurality of spur gears arranged in intermeshed working relation. It should be noted that the rotary pumps could be positioned other than in a stacked or linear array. Such an array could have circular or cluster like configuration.

The second embodiment also differs from the first in that the rotors of each rotor set may be of different size. In addition, since correspondingly positioned rotors are not mounted on a common axis, each of the rotor sets may rotate at different velocities. More specifically, the rotary pump means arranged adjacent the ignition means comprises at least two rotors which are smaller in diameter than the remaining rotors of the remaining rotor sets. In addition, the gear means cooperating with the shaft of this rotor set is larger and accordingly rotates slower than the remaining gears associated with the individual rotor sets.

An emission control assembly may be mounted in working relation at the exhaust end of the cylinder on either of the above described embodiments. This emission control assembly comprises an air intake pump means which includes at least two fluted rotors arranged such that the flutes of each rotor cooperatively engage one another so as to compress the gases passing therethrough. In operation, an air intake formed in the emission control assembly allows air to flow into the air compression set of rotors wherein the air is compressed and fed, by appropriately located conduit means, back into the cylinder at a point which the gases exit the second rotary pump assembly. At this point the compressed air is thoroughly mixed with the heated gases upon their expansion. The mixing of the heated exhaust gases with the additional compressed air causes the burning away of any air pollutants such as hydrocarbons or the like. The auxiliary air can be added to the cylinder at any point most efficient for complete combustion of any air pollutants.

In operation, both of the above discussed embodiments may be efficiently applied to automobiles or like vehicles in such a manner as to eliminate a need for conventional transmissions and/or differentials. In this type of application, the individual rotary pumps which comprise the third rotary pump means are physically separated. At least one of the rotary pumps is arranged in direct driving relation to each driving wheel of the vehicle. Alternatively, a combination of pumps could be so mounted to provide a speed variation in driving the wheels. The remaining portion of the third rotary pump means remains in direct communication with the second rotary pump means so as to receive the combusted, expanding gases therefrom. It should be emphasized that the portion of the third rotary pump means arranged in direct communication with the second rotary pump means must have at least an equal capacity as the first rotary pump means which serves to compress the incoming gases. The rotary pump arranged in direct driving relation with the wheels communicates with the remaining portion of the third rotary pump means through a valve arrangement which serves to selectively direct the expanding gases to either end of this rotary pump means. The wheels can thereby be driven in either a forward or reverse direction by means of channeling the expanding gases to flow through the rotary pump in the required direction to rotate the wheels of the vehicle in either a forward or reverse direction.

The invention accordingly comprises the features of construction, combination of elements and arrangement of parts which can be exemplified in the construction hereinafter set forth, and the scope of the invention will be indicated in the claims.

BRIEF DESCRIPTION OF THE DRAWINGS

For a fuller understanding of the nature and the objects of the invention, reference should be had to the following detailed description taken in connection with the accompanying drawings in which:

FIG. 1 is a sectional view of one embodiment of the present invention wherein a plurality of rotary pumps are arranged in successive linear relation within an elongated cylinder and an emission control assembly is mounted thereon.

FIG. 2 is a section view taken along line 2—2 of FIG. 1 showing the engagement of flutes on the individual rotors of a rotor set.

FIG. 3 is a sectional view of another embodiment of the present invention wherein a plurality of rotary pumps are arranged in a substantially stacked array.

FIG. 4 is an end view of the embodiment of FIG. 3 showing the interaction of the gear means cooperating with the individual rotary pumps.

Similar reference characters refer to similar parts throughout the several views of the drawing.

DETAILED DESCRIPTION OF THE INVENTION

Referring to FIG. 1, the rotary engine of the present invention comprises a casing generally indicated as 10 and having an elongated cylinder 12 defined therein. A cooling jacket 14 is designed to contain water or other cooling fluid and is arranged to surround cylinder 12 as clearly shown in FIG. 2.

A plurality of rotary pump means are successively arranged in substantially linear fashion within cylinder 12 and are positioned in communicating relation to one another so as to produce distinct intake, compression, combustion-expansion and exhaust phases during rotation of the rotary pump means. Each rotary pump means may comprise one or more rotary pumps. In the particular embodiment of FIGS. 1 and 2, the first rotary pump means includes two rotor sets generally indicated as 16 and 18. Each of these rotor sets comprises two fluted rotors 20, 22 and 24, 26 respectively. Similarly, the second rotary pump means comprises a rotor set generally indicated as 28 and including two fluted rotors 30 and 32. The third rotary pump means comprises three rotor sets 34, 36 and 38 each including two fluted rotors 40 and 41, 42 and 44, and 46 and 48 respectively. Each fluted rotor of each rotor set is mounted on a common drive shaft with the correspondingly positioned rotors of the remaining rotor sets arranged in cylinder 12. More specifically, in the embodiment of FIG. 1, fluted rotors 20, 24, 30, 40, 42 and 46 are all mounted on drive shaft 47. Similarly, rotors 22, 26, 32, 41, 44 and 48 are all mounted on drive shaft 49. Cover caps 51 and 53 are located at opposite ends of the cylinder and serve to rotatably support the drive shafts by means of bearings 55, 57 and 59, 60. Each rotor is positioned on its respective drive shaft so as to have its flutes 50 operatively engage the flutes of the other rotor or rotors in the same rotor set, as shown in FIG. 2. The cooperation of the flutes of the rotors of a rotor set with each other and with the cylinder walls causes an interaction between the gases passing through the cylinder and the rotor set itself, as will be explained in detail hereinafter.

In operation, a combustible mixture of gases enters cylinder 12 by means of intake 52. The first rotary pump means comprising rotary sets 16 and 18 is positioned at the extremity of cylinder 12 adjacent to intake 52. Consequently, the combustionable gases are successively compressed as they pass through rotor sets 16 and 18 respectively. Compressed gases exiting from rotor set 18 pass immediately into the second rotary pump means comprising rotor set 28. Ignition means in the form of conventional sparkplugs 54 and 56 are mounted on casing 10 and communicate with the interior of cylinder 12 in a area immediately adjacent to rotor set 28. Upon the compressed combustionable gases entering rotor set 28, the sparkplugs 54 are activated causing the combustion of these compressed gases. These combusted gases, now being greatly expanded, pass into the third rotary pump means comprising rotor sets 34, 36 and 38. Since the combusted gases are in a greatly expanded state, they produce a wedging action first on the rotors of rotor set 34 and then successively on the rotors of rotor sets 36 and 38. This wedging action provides the driving force to rotate drive shaft 47 and 49 and is comparable to the power stroke in the conventional reciprocating engine.

Upon exiting rotor set 38 the gases may pass either to exhaust or to one or more additional sets of rotors for additional expansion. The emission control assembly comprises an air compression rotary pump means including at least one rotor set 64. This rotor set also comprises two fluted rotors, 66 and 68, connected to drive shaft 47 and 49 respectively in such a manner that the flutes of each rotor are intermeshed. Air intake means 70 supplies fresh air to compartment 74 in which rotor set 64 is arranged. Upon the air entering compartment 74 it is compressed through interaction with rotors 66 and 68. After compression the air passes through conduit 76 which communicates directly with the interior of cylinder 12 at a point between the second and third rotary pump means or, as shown in FIG. 1, between rotor sets 28 and 34. The fresh air is intermixed with the heated gases passing from rotor set 28 and this mixture expands as it passes through successive rotor sets 36, 34 and 44. Due to the adding of extra air, and the temperature of this mixture, the hydrocarbons and other waste material in the exhaust is consumed so as to emit a pollutant-free exhaust through outlet 78 from the rotor set 44. This engine is designed such that the compressed air could enter cylinder 12 at any point most efficient for complete combustion of the hydrocarbons and other air pollutants remaining in the gases after passing through the combustion phase occurring at rotor set 28.

Although the embodiment of FIG. 1 has been specifically described with reference to the first, second and third rotary pump means comprising a specific number of rotor sets, it should be noted that all the pump means described could comprise a single rotor set depending upon the specific characteristics the motor would be designed to have.

FIGS. 3 and 4 are related to another embodiment of the invention wherein the rotor sets comprising the first, second and third rotary pump means are arranged in a substantially stacked array. More specifically, this embodiment includes a casing generally indicated at 80 having a cylinder 82 defined therein. The cylinder is generally configured to include a plurality of compartments which are separated by cooling jacket 84 designed to carry a cooling fluid. A first rotary pump means comprises rotor set 86 which includes fluted rotors 88 and 90 arranged at the end of cylinder 82 adjacent to intake 92.

The second rotary pump means comprises a single rotor set 94 also including two fluted rotors 96 and 98. Rotor set 94 is arranged in cylinder 82 adjacent to ignition means which may be in the form of a conventional sparkplug 100. The third rotary pump means comprises two rotor sets 102 and 104 each including two fluted rotors 106, 108 and 110, 112. The third rotary pump means is located at the end of cylinder 82 adjacent to and in communication with exhaust 114. Each rotor set of each rotary pump means cooperates with an individual drive shaft. More specifically, rotor sets 86, 94, 102 and 104 cooperate with drive shafts 116, 118, 120 and 122 respectively. Each of these drive shafts are interconnected to one another by means of a plurality of spur gears 124, 126, 128 and 130. Each of the drive shafts are rotatably mounted on casing 82 by correspondingly positioned bearings engaging the ends of each shaft and mounted on cover plates 132 and 134 affixed to each end of casing 80.

The structure of the first and second embodiments differ in that the rotor sets of the embodiment shown in FIGS. 3 and 4 may be arranged to rotate at different speeds and accordingly may have various sized diameters. The rotational speed is of course regulated by the size of the spur gear mounted on the drive shaft which cooperates with the particular rotor set in question. In the particular embodiment shown, spur gear 126 is larger than both of its adjacent spur gears thereby causing the rotary set 94, which comprises the second rotary pump means, to rotate slower than the remaining rotor sets of the other second and third rotary pump means. As is true in the embodiment of FIG. 1, the capacity of gas capable of being handled by any rotor set is dependent upon the number, depth and width of the flutes of the particular rotors used, plus the size of the gear controlling the speed of the pump means.

It should further be noted that while both embodiments of this invention have been described with particular reference to the rotary pumps utilizing a pair of fluted rotors, any applicable rotary pump structure could be used in this rotary engine. This includes rotary pump structures utilizing a simple shaft.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention, which as a matter of language, might be said to fall therebetween.

Now that the invention has been described, what is claimed is:

1. A rotary internal combustion engine comprising: a casing, a plurality of rotary pump means mounted in successive continuously communicating relation with one another within a cylinder defined by the interior of said casing, compression, ignition and power stages successively defined within said cylinder by one or more of said plurality of rotary pump means, said compressor stage comprising a first rotary pump means positioned adjacent the intake portion of said casing, wherein gases entering said cylinder are compressed by said first rotary pump means; said ignition stage comprising a second of said plurality of rotary pump means, ignition means arranged on said casing in communicating relation with said second rotary pump means, whereby combustion of gases passing through said second pump means occurs upon activation of said ignition means; said power stage comprising a third rotary pump means arranged in said casing in intercommunicating relation with said second rotary means, drive shaft means connected to at least said third rotary pump means, whereby said drive shaft means is driven by interaction of said third rotary pump means with said combusted gases coming from said second rotary pump means.

2. A rotary engine as in claim 1 wherein said plurality of rotary pump means each comprises at least one fluted rotor rotatably mounted within said cylinder, each of said rotors arranged within said cylinder in direct communication with the adjacently positioned rotor.

3. A rotary engine as in claim 1 wherein each said plurality of rotary pump means each comprises at least one set of rotors mounted within said cylinder, each set including at least two fluted rotors, at least one of said rotors rotatably mounted in cooperating relation with at least one other rotor in its respective set, such that each flute of said one rotor is arranged in working engagement with a correspondingly positioned flute of said other rotor, whereby compression takes place through the interaction of cooperating flutes of at least one rotor set.

4. A rotary engine as in claim 3 wherein said plurality of rotor sets are arranged in substantially linear relation to one another and parallel to the longitudinal axis of said cylinder.

5. A rotary engine as in claim 3 wherein each rotor of each rotor set is mounted on a common drive shaft with correspondingly positioned rotors of the remaining rotor sets.

6. A rotary engine as in claim 3 wherein said rotor sets are rotatably mounted within said casing in a non-collinear array such that the longitudinal axis of each rotor set is arranged in substantially parallel relation to one another.

7. A rotary engine as in claim 6 wherein said drive shaft means comprises a plurality of parallel arranged shafts, said shafts being interconnected by gear means attached to each of said shafts, said gear means attached to said second rotary pump means being larger than the adjacent gear means such that said second rotary pump means is caused to rotate slower than the next adjacent pump means due to the interaction of the gear means associated with said second pump means and the next adjacent gear means.

8. A rotary engine as in claim 3 wherein said first rotary pump means comprises at least two sets of rotors arranged in successive fashion and communicating with both the cylinder intake and said second rotary pump means, whereby compression of gases from the intake takes place successively through interaction with said two sets of rotors of the first rotary pump means.

9. A rotary engine as in claim 3 wherein said third rotary pump means comprises at least two sets of rotors arranged in communicating relation with said second rotary pump means and the cylinder exhaust, said rotors of said third rotary pump means connected to said drive shaft means, gases from said second rotary pump means interacts with said third rotary pump means causing rotation of said drive shaft means.

10. A rotary engine as in claim 1 further comprising an emission control assembly mounted in communicating relation with the exhaust portion of said cylinder.

11. A rotary engine as in claim 10 wherein said emission control system mounted on said casing in communication with the cylinder exhaust comprises air intake means communicating with said cylinder at a point adjacent to said second and third rotary pump means, whereby gases from said second rotary pump means is mixed with air and passed successively to said third rotary pump means and the exhaust.

12. A rotary engine as in claim 11 wherein said emission control system comprises a fourth rotary pump means arranged in communicating relation with said air intake means and said cylinder so as to compress air from said air intake means before being mixed with gases from said second rotary pump means.

13. A rotary engine as in claim 12 wherein said fourth pump means comprises at least one set of rotors, said one set including at least two fluted rotors, whereby compression of gases passing through said one set take place through the interaction of intermeshing flutes of the rotors of said set.

14. A rotary engine as in claim 13 wherein each rotor or each rotor set of said fourth pump means is mounted on a common drive shaft with correspondingly positioned rotors comprising said first, second and third rotary pump means.

15. A rotary engine as in claim 12 wherein said fourth rotary pump means comprises at least one rotor set, said air intake arranged in communicating relation with one end of said one rotor set of said fourth rotary pump means, conduit means interconnected between the opposite end of said one rotor set and said cylinder.

* * * * *